(12) United States Patent
Libera

(10) Patent No.: US 7,586,548 B2
(45) Date of Patent: Sep. 8, 2009

(54) STAND-BY POWER SUPPLY SHUTDOWN AT POWER ON

(75) Inventor: John Libera, Fallbrook, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1353 days.

(21) Appl. No.: 10/307,703

(22) Filed: Dec. 2, 2002

(65) Prior Publication Data

US 2004/0105034 A1 Jun. 3, 2004

(51) Int. Cl.
H04N 5/63 (2006.01)

(52) U.S. Cl. ...................................... 348/730

(58) Field of Classification Search ................. 348/730; 363/62, 126, 146; 307/140, 146, 142, 43; 327/454; 455/343.6; 365/228
See application file for complete search history.

(56) References Cited

U.S. PATENT DOCUMENTS

| | | | |
|---|---|---|---|
| 3,584,222 A | 6/1971 | Nesbitt ........................ 250/206 |
| 3,932,770 A | 1/1976 | Fantozzi ....................... 307/117 |
| 4,249,089 A * | 2/1981 | Wolford et al. .............. 307/140 |
| 4,532,457 A * | 7/1985 | Haferl .......................... 315/411 |
| 4,626,892 A * | 12/1986 | Nortrup et al. ............... 348/569 |
| 4,628,268 A | 12/1986 | Matsubara ................... 324/418 |
| 4,628,431 A | 12/1986 | Kayser ......................... 363/49 |
| 4,641,205 A * | 2/1987 | Beyers, Jr. ..................... 386/83 |
| 4,651,342 A * | 3/1987 | Mengel .................... 455/151.1 |
| 5,029,005 A * | 7/1991 | Morris, Jr. ................... 348/632 |
| 5,175,441 A * | 12/1992 | den Hollander .............. 307/43 |
| 5,255,094 A * | 10/1993 | Yong et al. ................... 348/632 |
| 5,483,464 A * | 1/1996 | Song ........................... 713/300 |
| 5,565,714 A | 10/1996 | Cunningham ................ 307/112 |
| 5,579,197 A * | 11/1996 | Mengelt et al. ............. 361/93.4 |
| 5,920,186 A | 7/1999 | Ninh et al. ................... 323/303 |
| 5,999,421 A * | 12/1999 | Liu ............................ 363/21.15 |
| 6,092,207 A * | 7/2000 | Kolinski et al. ............. 713/323 |
| 6,272,030 B1 * | 8/2001 | Oomura ........................ 363/62 |
| 6,316,844 B1 * | 11/2001 | Arima .......................... 307/65 |
| 6,515,379 B1 * | 2/2003 | Nojima et al. ................ 307/64 |

(Continued)

FOREIGN PATENT DOCUMENTS

JP 11-69261 * 3/1999

(Continued)

Primary Examiner—Paulos M Natnael
(74) Attorney, Agent, or Firm—John L. Rogitz

(57) ABSTRACT

A stand-by power supply circuit is provided that controls power consumption and decreases electromagnetic interference during operation of a television. In one embodiment, the stand-by power supply circuit is connected to a switch that is connected to an AC line. The switch is located a prearranged distance from a main power supply circuit and provides a method for reducing the electromagnetic interference caused by the stand-by power supply circuit in an operating television by disconnecting the AC line from the stand-by power supply circuit and connecting the AC line to the main power supply circuit via the switch during a power-on mode/operation. In another embodiment, the switch includes a stand-by power supply circuit switch and a main power supply circuit switch which provide proper timing for the connection of the AC line to the main power supply circuit and the disconnection of the AC line from the stand-by power supply circuit to guarantee uninterrupted and cost-effective power consumption during the power-on operation.

7 Claims, 1 Drawing Sheet

U.S. PATENT DOCUMENTS

| | | | | |
|---|---|---|---|---|
| 6,563,233 B1 * | 5/2003 | Hinks | | 307/64 |
| 6,671,194 B2 * | 12/2003 | Takahashi | | 363/69 |
| 6,995,807 B2 * | 2/2006 | Libera | | 348/730 |
| 2002/0091978 A1 * | 7/2002 | Higashida | | 714/726 |

FOREIGN PATENT DOCUMENTS

| | | | |
|---|---|---|---|
| JP | 2001-37079 | * | 7/1999 |
| JP | 2001-037079 | * | 2/2001 |

* cited by examiner

STAND-BY POWER SUPPLY SHUTDOWN AT POWER ON

This application incorporates herein by reference patent application Ser. No. 10/007,925, of John Libera, entitled MICRO-POWER STAND-BY MODE filed concurrently herewith.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of power supply circuits. More particularly, this invention relates to a system and method for stand-by power supply circuits.

BACKGROUND OF THE INVENTION

Power supply circuits are utilized in electronic devices to provide an electronic device with continuous operation. For example, a television set utilizes a power supply circuit to provide electrical power for reception and transmission of broadcast, cable or satellite signals to a user. Many electronic devices include a standby mode which provides electrical power to the electronic device for activating such devices. Again for example, a present-day television set is equipped with a low power stand-by power supply circuit, to activate the television set and operate at times when the television set is in a power-off mode.

The stand-by power supply circuit provides electrical power to a micro-controller and infra-red receiver such that the power-on may be accomplished by a remote control at any time. Contrary to what the term "stand-by power supply" implies, the stand-by power supply circuit does not stop working when the television set is in power-on mode, the circuit also remains fully operational in power-on mode to keep delivering electrical power to the micro-controller and other digital circuits. In essence, stand-by power supply circuits provide continuous electrical power to electronic devices both in power-on and power-off modes.

Although stand-by power supply circuits produce only about one or two watts of output electrical power, the standby power supply circuits emit disproportionately large amounts of electromagnetic interference (EMI). The production of EMI from the stand-by power supply circuit constitutes one or more sources of noise and interference whose harmonic frequencies mix with those of a main power supply circuit, as well as those of deflection and other circuits. Having two or more power supply circuits located in close proximity to sensitive circuits poses serious threat of interference, for example beat noise, that degrades television picture quality and is difficult and costly to combat. As the need for higher picture quality and the regulation of power consumption increases it would be desirable to provide electronic devices that control power consumption and decrease EMI without increasing the resulting cost of the devices.

SUMMARY OF THE INVENTION

In view of the foregoing, a stand-by power supply circuit is provided that controls power consumption and decreases EMI during operation of a television.

In particular, and in one embodiment, the stand-by power supply circuit is connected to a switch that is connected to an AC line, with a main power supply circuit located a prearranged distance from the switch. In one embodiment, a method for reducing electromagnetic interference caused by the stand-by power supply circuit in an operating television includes disconnecting the AC line from the stand-by power supply circuit and connecting the AC line to the main power supply circuit via the switch in a power-on mode.

In a further embodiment, a stand-by power supply circuit switch and a main power supply circuit switch may be provided to properly time the connection of the AC line to the main power supply circuit and the disconnection of the AC line from the stand-by power supply circuit to guarantee uninterrupted and cost-effective power consumption.

These and other features and advantages of the invention will be understood upon the consideration of the following detailed description of the invention and accompanying drawings. The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

The following detailed description, given by way of example, and not intended to limit the present invention solely thereto, will best be understood in conjunction with the accompanying drawings in which.

DETAILED DESCRIPTION OF THE INVENTION

While the present invention has been particularly shown and described with reference to an embodiment(s), it will be understood that various changes and modifications may be made without departing from the spirit and scope of this invention. It is intended that the appended claims be interpreted to cover the embodiments described herein and all equivalents thereto.

Figure 1:
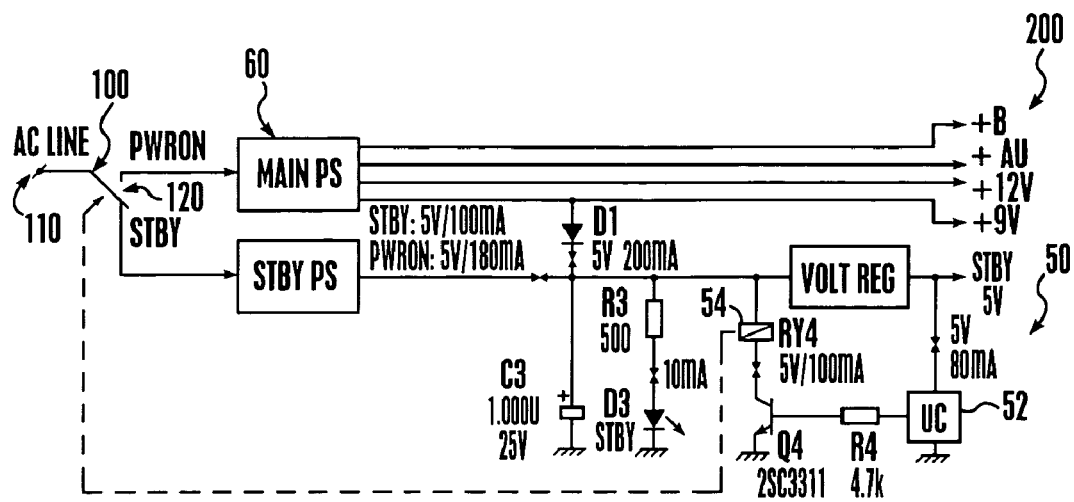
FIG. 1 is a block diagram of one embodiment of a television set circuit including a stand-by power supply circuit and a main power supply circuit with a switch connected to the stand-by power supply circuit.

Turning now to FIG. 1, one embodiment of a television set circuit 200 is shown. Television set circuit 200 includes a stand-by power circuit 50 and a main power supply circuit 60. Television set circuit 200 also includes at least one switch 100 connected to an AC line 110. Switch 100 is located between stand-by power supply circuit 50 and main power supply circuit 60. Switch 100 connects AC line 110 to stand-by power supply circuit 50 and/or to main power supply circuit 60. Switch 100 also disconnects AC line 110 from main power supply circuit 60 and/or stand-by power supply circuit 50. Stand-by power supply circuit 50 also includes a micro-controller 52 electrically connected to a relay 54. Micro-controller 52 is also electrically connected to switch 100 via relay 54.

In operation, television set circuit 200 is provided with stand-by power supply circuit 50 and switch 100 to reduce electromagnetic interference in a television (not shown) during operation. While operating the television, reduction of electromagnetic interference generated by stand-by power supply circuit 50 is accomplished by disconnecting AC line 110 from stand-by power supply circuit 50 via switch 100. In one embodiment, disconnecting AC line 110 from stand-by power supply circuit 50 includes connecting AC line 110 to main power supply circuit 60 via switch 100. Once the operation of the television is terminated, the need for reduction of electromagnetic interference generated by stand-by power supply circuit 50 is no longer needed and AC line 110 is disconnected from main power supply circuit 60 and connected to stand-by power supply circuit 50 via switch 100.

In another embodiment, television set circuit 200 forms part of an electromagnetic interference reduction system which includes stand-by power supply circuit 50 and at least one switch 100 connected to AC line 100. Switch 100 is located a prearranged distance (not shown) from stand-by power supply circuit 50 and a prearranged distance 120 from main power supply circuit 60. Switch 100 is also configured to be in electrical communication with micro-controller 52 and close main power supply circuit 60 and/or stand-by power supply circuit 50 by forming a connection with AC line 110 and main power supply circuit 60 and/or stand-by power supply circuit 50, respectively.

Figure 2:
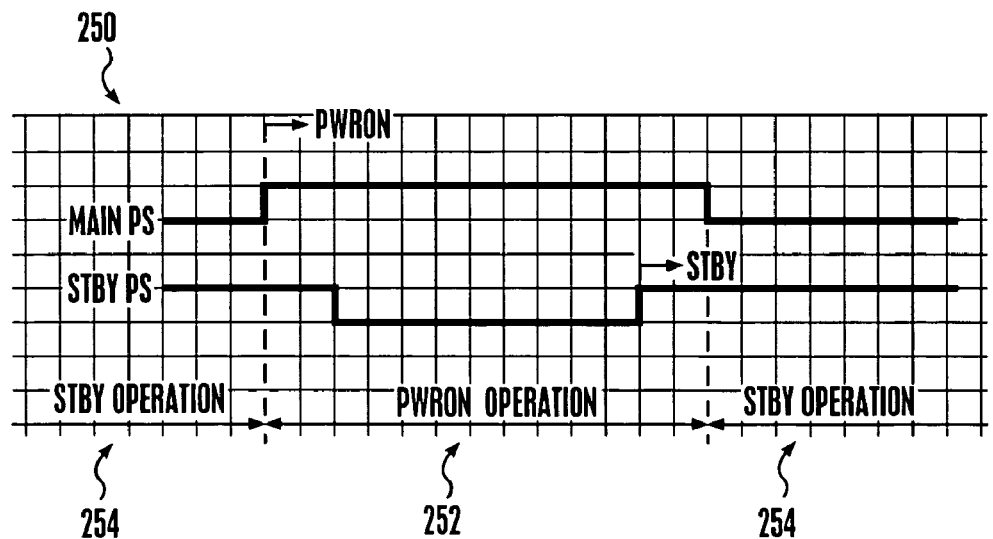
FIG. 2 is a graphical demonstration of the operation of another embodiment of the stand-by power supply circuit with the operation of the main power supply circuit of the television set circuit shown in FIG. 1.

FIG. 2 is a graphical depiction 250 of the operation of another embodiment of stand-by power supply circuit 50 (shown in FIG. 1) with the operation of main power supply circuit 60 (shown in FIG. 1). In a further embodiment, switch 100 (shown in FIG. 1) includes a stand-by power supply circuit switch (not shown) and a main power supply circuit switch (not shown). In the further embodiment, micro-controller 52 (shown in FIG. 1) is configured to activate the stand-by power supply circuit switch during a power-on operation 252. The stand-by power supply circuit switch is configured to open stand-by power supply circuit 50 and disconnect AC line 110 (shown in FIG. 1) from stand-by power supply circuit 50 during power-on operation 252. Micro-controller 52 is further configured to activate the main power supply circuit switch and close main power supply circuit 60 by connecting AC line 110 to main power supply circuit 60. During a stand-by operation 254, micro-controller 52 is configured to activate the main power supply circuit switch and open main power supply circuit 60 and disconnect AC line 110 from main power supply circuit 60. Micro-controller 52 is further configured to activate the stand-by power supply circuit switch and close stand-by power supply circuit 50 by connecting AC line 110 to stand-by power supply circuit 50.

Figure 1A:
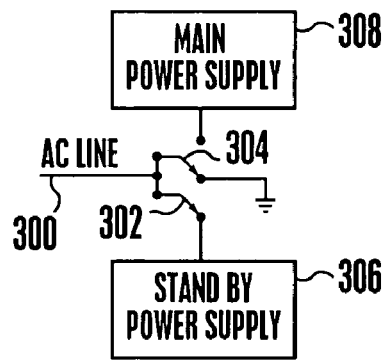
FIG. 1A shows an embodiment with two switches.

The above dual switch arrangement is shown in FIG. 1A, wherein an AC line 300 is connected to a standby switch 302 and to a main power supply switch 304. When the standby switch 302 is in the position shown, power is supplied to a standby power supply 306, with the main power supply switch 304 not supply power to a main power supply 308. In contrast, when the main power supply switch 304 connects the AC line 300 to the main power supply 308, the standby switch 302 opens to deenergize the standby power supply 306 in accordance with teachings above.

In operation, the reduction of electromagnetic interference generated by stand-by power supply circuit 50 is accomplished by timing the connection of AC line 110 to main power supply circuit 60 and timing the disconnection of AC line 110 from stand-by power supply circuit 50 after the connection of AC line 110 to main power supply circuit 60. Once the operation of the television is terminated, the need for the reduction of electromagnetic interference generated by stand-by power supply circuit 50 is no longer needed and stand-by operation 254 is accomplished by timing the connection of AC line 110 to stand-by power supply circuit 50 and timing the disconnection of AC line 110 from main power supply circuit 60 after connection of AC line 110 to stand-by power supply circuit 50 is performed.

Various other modifications and alterations in the structure and method of operation of this invention will be apparent to those skilled in the art, without departing from the scope and spirit of the invention. Although the invention has been described in connection with specified embodiments, it should be understood that the invention as claimed should not be unduly limited to such specific embodiments. It is intended that the following claims describe the scope of the present invention and that the structures and methods within the scope of these claims and their equivalents be covered thereby.

What is claimed is:

1. A television comprising a standby power supply circuit and a main power supply circuit, said television comprising at least one switch connected to an AC line and located between the standby power supply circuit and the main power supply circuit to cause the standby power supply circuit to be deenergized when the main power supply circuit is energized, the switch disconnecting the AC line from the stand-by power supply circuit by connecting the AC line to the main power supply circuit, wherein the connecting of the AC line to the main power supply circuit includes timing the connection of the AC line to the main power supply circuit, the timing including disconnecting the AC line from the stand by power supply circuit after connecting the AC line to the main power supply circuit.

2. A television in accordance with claim 1, wherein said switch connects said AC line to the standby power supply circuit.

3. A television in accordance with claim 1, wherein said switch connects said AC line to the main power supply circuit.

4. A television in accordance with claim 2, wherein said switch disconnects said AC line from the main power supply circuit.

5. A television in accordance with claim 3, wherein said switch disconnects said AC line from the standby power supply circuit.

6. A method for reducing electromagnetic interference in a television including a standby power supply circuit, a main power supply circuit, and an AC line, said method comprising:

providing at least one switch between the standby power supply circuit and the main power supply circuit, said switch connected to the AC line, the switch maintaining the standby power supply circuit disconnected from the AC line if the main power supply circuit is connected to the AC line;

disconnecting the AC line from the stand-by power supply circuit via said switch, wherein said step of disconnecting comprises the step of connecting the AC line to the main power supply circuit via said switch, wherein said step of connecting comprises the step of timing the connection of the AC line to the main power supply circuit, and wherein said step of timing comprises disconnecting the AC line from the stand by power supply circuit after connecting the AC line to the main power supply circuit.

7. A method for reducing electromagnetic interference in a television including a standby power supply circuit, a main power supply circuit, and an AC line, said method comprising the step of providing at least one switch between the standby power supply circuit and the main power supply circuit, said switch connected to the AC line, the switch maintaining the standby power supply circuit disconnected from the AC line if the main power supply circuit is connected to the AC line, the method including: disconnecting the AC line from the main power supply circuit via said switch, wherein said step of disconnecting comprises the step of connecting the AC line to the standby power supply circuit via said switch, wherein said step of connecting comprises the step of timing the connection of the AC line to the standby power supply circuit, wherein said step of timing comprises disconnecting the AC line from the main power supply circuit after connecting the AC line to the standby power supply circuit.

\* \* \* \* \*

UNITED STATES PATENT AND TRADEMARK OFFICE
CERTIFICATE OF CORRECTION

PATENT NO.        : 7,586,548 B2
APPLICATION NO. : 10/307703
DATED             : September 8, 2009
INVENTOR(S)       : John Libera It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1465 days.

Signed and Sealed this

Fourteenth Day of September, 2010

David J. Kappos
*Director of the United States Patent and Trademark Office*